United States Patent [19]

Snaper

[11] Patent Number: 5,442,846
[45] Date of Patent: Aug. 22, 1995

[54] PROCEDURE AND APPARATUS FOR COLD JOINING OF METALLIC PIPES

[76] Inventor: Alvin A. Snaper, 2800 Cameo Cir., Las Vegas, Nev. 89107

[21] Appl. No.: 126,251

[22] Filed: Sep. 23, 1993

[51] Int. Cl.$^6$ ............................................. B23P 17/00
[52] U.S. Cl. ...................... 29/419.2; 29/516; 29/458; 72/29; 72/56; 285/382.1; 285/382.2; 285/915
[58] Field of Search ............. 285/9.1, 417, 382, 382.2, 285/915, 21, 382.1; 29/DIG. 95, 419.2, 458, 516; 403/DIG. 1; 72/29, 56, 707

[56] References Cited

U.S. PATENT DOCUMENTS

| | | | |
|---|---|---|---|
| 2,001,204 | 5/1935 | Long et al. | 285/382 X |
| 2,121,558 | 6/1938 | Coe et al. | 285/382.2 X |
| 2,367,206 | 1/1945 | Davis | 285/417 X |
| 3,022,209 | 2/1962 | Campbell | 285/21 X |
| 3,068,563 | 12/1962 | Reverman | 285/382.2 X |
| 3,238,346 | 3/1966 | Savko | 285/21 X |
| 3,581,456 | 6/1971 | Gere | 72/56 X |
| 3,590,464 | 7/1971 | Wildi | 29/419.2 |
| 3,992,773 | 11/1976 | Duffner | 72/56 X |
| 4,657,287 | 4/1987 | Nimke | 285/915 X |
| 4,902,048 | 2/1990 | Washizu | 285/915 X |

FOREIGN PATENT DOCUMENTS

| | | | |
|---|---|---|---|
| 111904 | 6/1956 | France | 285/382 |
| 6803460 | 9/1969 | Germany | 285/382 |

OTHER PUBLICATIONS

Time magazine pp. 73, May 8, 1964.

*Primary Examiner*—Dave W. Arola
*Attorney, Agent, or Firm*—Donald D. Mon

[57] ABSTRACT

Joinder of two adjacent segments of steel pipe having an outer diameter of at least 12 inches, by a bridging sleeve, the sleeve being joined to both pipe segments by magnetic forming. Apparatus enabling the process includes a segmented ring-shaped coil brought together around the joinder, to form a complete coil circuit for magnetic forming.

4 Claims, 4 Drawing Sheets

PROCEDURE AND APPARATUS FOR COLD JOINING OF METALLIC PIPES

FIELD OF THE INVENTION

Method and apparatus for cold joining metallic pipes with the use of magnetic force.

BACKGROUND OF THE INVENTION

This invention comprises a method and implementing apparatus to permit joining of metallic tubes, such as oil or gas pipelines, and oil well casings, without flame or arc welding. The invention is based upon use of the magnetic "pinch effect", sometimes called "magnetic pulse forming", to squeeze a joining tube of conductive metal around the ends of similarly electrically conductive or less electrically conductive pipes to be joined. With care in use, the method also can be used to join pipes of the same conductive material as the joining tube, or even tubes of non-conductive materials, such as ceramic ("tile") utilizing a conductive connection. The method also can be applied to produce neck-down or flare-up joints between tubes of different sizes.

In addition to being a flame hazard, the use of arc welding on steel pipes can produce serious stress microcracks that can form the basis for splits and ruptures when the metal is vibrated or stressed in the future. Some examples of disasters from this cause were experienced during the 1940's when arc welders used to "strike an arc" against the deck plates of a "Victory Ship" being constructed. The micro-cracks being later worked by the motion of the ship at sea, apparently caused several instances of tearing that nearly or completely destroyed the ships. This phenomenon apparently is worse when the arc welding is done in very cold weather, when the arc appears to instantly, in effect, anneal smaller width lines along the steel (versus the same situation in warm weather). In addition, arc welding tends to be non-uniform, and requires greater-operator skill and complicated post welding inspections.

In the oil drilling environment, it would be particularly advantageous to have a means for cold joining the sections of well casing pipes as they were successively sunk into the hole, without heat and without the need for accurately threaded fittings. Threaded fittings require some turning of the pipe sections in advance, or even on site. Although flame brazing and arc welding have been used to join pipes in the drilling field environment, there is often the risk of igniting a flame which is difficult to extinguish, because hydrocarbon gases tend to escape from the hole before any oil is found.

Similarly, large pipeline segments can be joined in the field without requiring the tedious and time-consuming efforts required by any class of welding, and this can be done in any kind of weather.

Long before the so called "heavy press" program or the explosive forming program for forming large objects, a still older method involved beating the soft metal against a sand bag, and repetitively trying its fit over the pattern. Although the results were acceptable, there also was a non-uniform distribution of work hardening stresses in the metal as the result of many, versus few, hammer blows on the various areas.

The magnetic pinch effect or "magnetic pulse forming" has for several decades been used to cause conductive metals, such as duraluminum to very rapidly (almost instantly) conform to a male pattern in order to produce deep draw forms, such as aircraft engine nacelles. This reduced the labor that formerly was involved in the repetitive hand forming and fitting of sections of sheet aluminum to a wooden, ceramic, plastic or plaster pattern.

Magnetic pulse forming, while requiring rather heavy and expensive equipment, is able to rapidly produce nearly identical draws to the same pattern with very little hand labor involved, and with the elimination of much of the human error that beset the earlier methods when used for certain classes of materials, and certainly with less expense and with greater convenience than the heavy presses or explosions which were previously involved.

Whenever a rapidly changing magnetic flux cuts across a conductive material, a current is induced within the material. This current is proportional to the initial intensity and time rate of change of the magnetic flux. The higher the rate of change, the greater the induced current.

Then, whenever there is an induced current, there is an associated magnetic field of such polarity as to oppose the magnetic field producing the current. This reactive force between the rapidly changing magnet and a metallic material within its field can produce very significant forces of repulsion. The effect sometimes is called "Lenz's Law Repulsion". One rather large-scale illustrative use of the effect is in the levitation of magnetically suspended railroad trains above the conductive tracks. In that case large alternating currents can be used in the coils to produce larger, repetitive changes in magnetic flux.

In magnetic pulse forming, a rapidly changing, unidirectional current is applied to the work coil from an energy storage capacitor. The required high rate of change of flux is produced by rapidly discharging a large electric charge from an energy storage capacitor through a very low resistance coil of a few turns. The initial discharge current can be extremely heavy and will rapidly decrease in the early part of its exponential decay curve. This heavy current, rapidly decaying, causes a rapidly decaying flux that induces a heavy, similarly decaying current within the metal of the work piece.

Because the flux is concentrated within the core of the work coil, the reaction flux from the induced current is directed radially outward against the flux of the work coil. This causes extreme forces of repulsion to "pinch" the work piece radially inward. (Of course, the work coil also, alternatively, can be placed within the work piece to produce a force that tends to swell the work piece radially outward toward an external form).

The basic principle of magnetic pulse forming is well known to the industry, but with the advent of heavy deep-draw presses, magnetic pulse forming tended to be less used in practice. However, as with any natural phenomenon, there are niches where it can become the method of choice in trade-offs versus the advantages and disadvantages of other methods of forming. The method herein described is such an application niche.

BRIEF DESCRIPTION OF THE INVENTION

A pair of pipe segments to be joined have their ends brought together. A conductive metal sleeve is placed around them, bridging the gap between them. A coil is placed around the sleeve, and a suitable electrical pulse is passed through it, thereby compressing the sleeve onto the pipes, and structurally bridging them.

Accordingly to a preferred but optional feature of the invention, external Grooves are formed in both of the pipes, into which the sleeve is pressed, in order to provide additional structural strength to resist axial separation of the pipe segments.

The above and other features of this invention will be fully understood from the following detailed description and the accompanying drawings in which:

DETAILED DESCRIPTION OF THE INVENTION

Figure 1A:
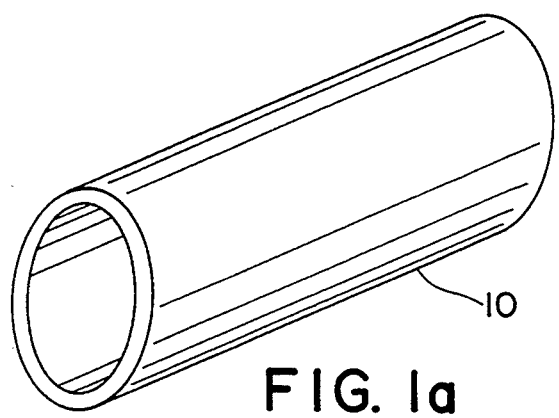
FIGS. 1a–1d are fragmentary views of four sequential conditions of the workpieces.
Figure 1B:
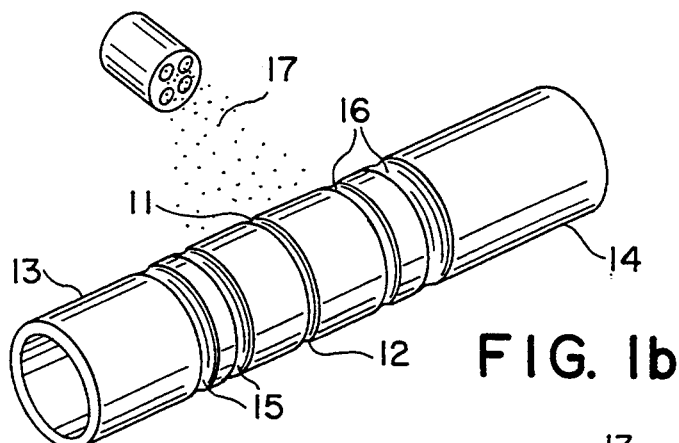

FIG. 1 shows a joining tube 10 made of a conductive metal, such as copper, brass, silver, beryllium copper, aluminum etc. that is sized for a smooth, loose fit over the ends 11, 12 of pipe segments 13, 14 which are to be joined. In each of the pipe segments to be joined, a multiplicity of annular grooves 15, 16 are cut by use of a cutting tool. These grooves are cut to a depth of about one third of the wall thickness of the pipes and are useful to provide a positive mechanical interlocking of the two joined ends. The ends of the pipes are roughly cut to meet each other, although the method allows for considerable mismatch, or "slop" in this, and they need not abut in full surface-to-surface contact although they may. Also, it is not necessary to have exactly accurate cuts in the grooves. The mechanical strength of the segments lost in cutting the grooves is later compensated for by the strength of the joining tube. Additionally, a small quantity of microencapsulated pressure sensitive adhesive (17) may be dusted into the grooves or coated on the interior of the joining tube, prior to placing the joining tube over the pipes. The joining tube is fitted over the gap between the pipe segments and over the grooves.

Figure 1C:
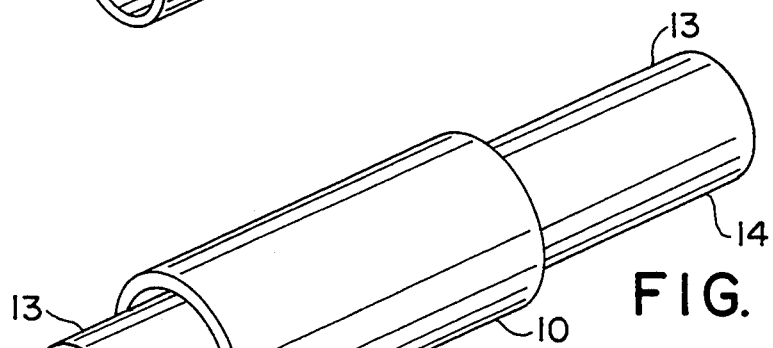
Figure 1D:
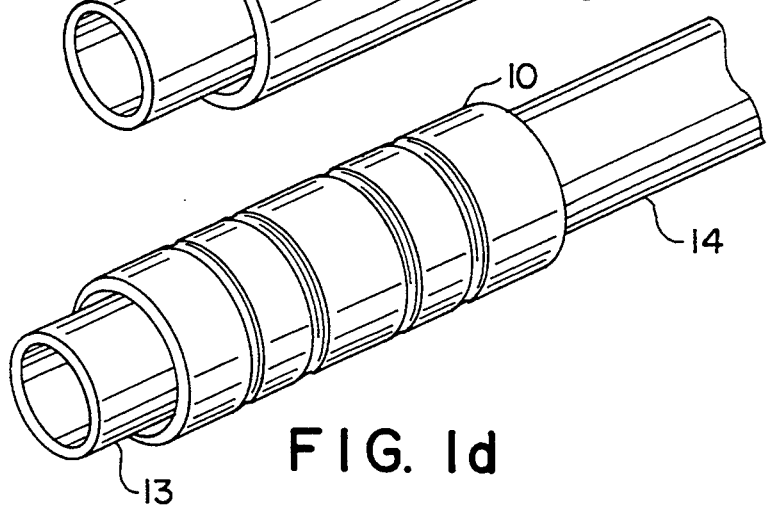
Figure 2:
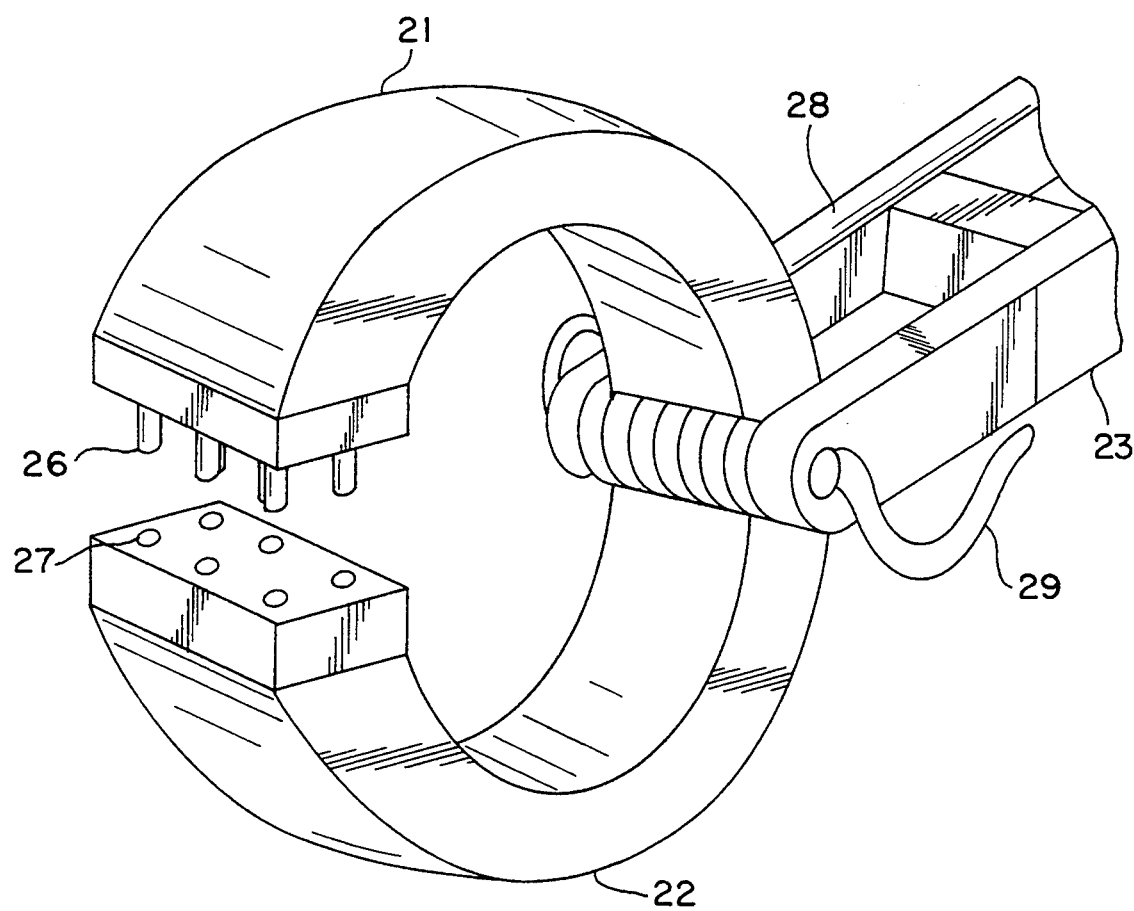
FIG. 2 is a semi-schematic view of the coil assembly.

A hinged magnetic work coil 20 FIG. 2 then is closed over the joint area in the condition shown in FIG. 1c, and the necessary heavy pulse of current is applied. This shrinks the more conductive outer joining tube more than the less conductive or partially shielded pipe segments, thus causing the metal of the joining tube to conform closely into the grooves and around the roughness of the somewhat irregular pipe segments. Because the pipe segments are not likely to have a perfectly smooth finish, and because the joining tube is not completely plastic during the short pulse of contraction, there may be tiny roughness spaces between the joining tube and the work pipes. Thus, the microencapsulated, pressure sensitive adhesive fills these micro-spaces to provide a pressure tight seal, as well as to provide an additional bonding. The extreme pressure between the pipe segments and the joining tube causes rupture of the tiny capsule, which permits the adhesive to flow out into the roughness of the pipe surfaces and into the grooves. The joined pipe segments have effectively been put together with a strong pressure-tight splice which required no significant amount of heat and no precision machining of the metal. Typically, the duration of the forming pulse is less than 1/10,000 of a second ($>$0.0001 Sec.)

THE APPARATUS

The working coil 20 is shown in FIG. 2. The coil is contained within a pair of jaws 21, 22 which are supported by a positioning arm 23. Arm 23 Grasps the pipe segments firmly, while permitting hand closure of the jaws over the working area, in a somewhat loose fit between the jaws and the pipe segments. The turns 25 of the coil are completed through connector pins 26 and sockets 27 to provide a completed coil circuit around the work area, when the jaws are closed.

In practical field applications the work pieces will be quite large, often on the order of 12 to 36 inches in diameter. The work head with its coil will accordingly be quite heavy, so that some means of support will be provided by a work vehicle which will contain the power supply and controls as well as the manipulating arm to position the coil jaws over the work pieces. The heavy conductive leads 28 and 29 to the two ends of the coil are carried down the positioning arm of the vehicle to the power/control unit.

Figure 3:
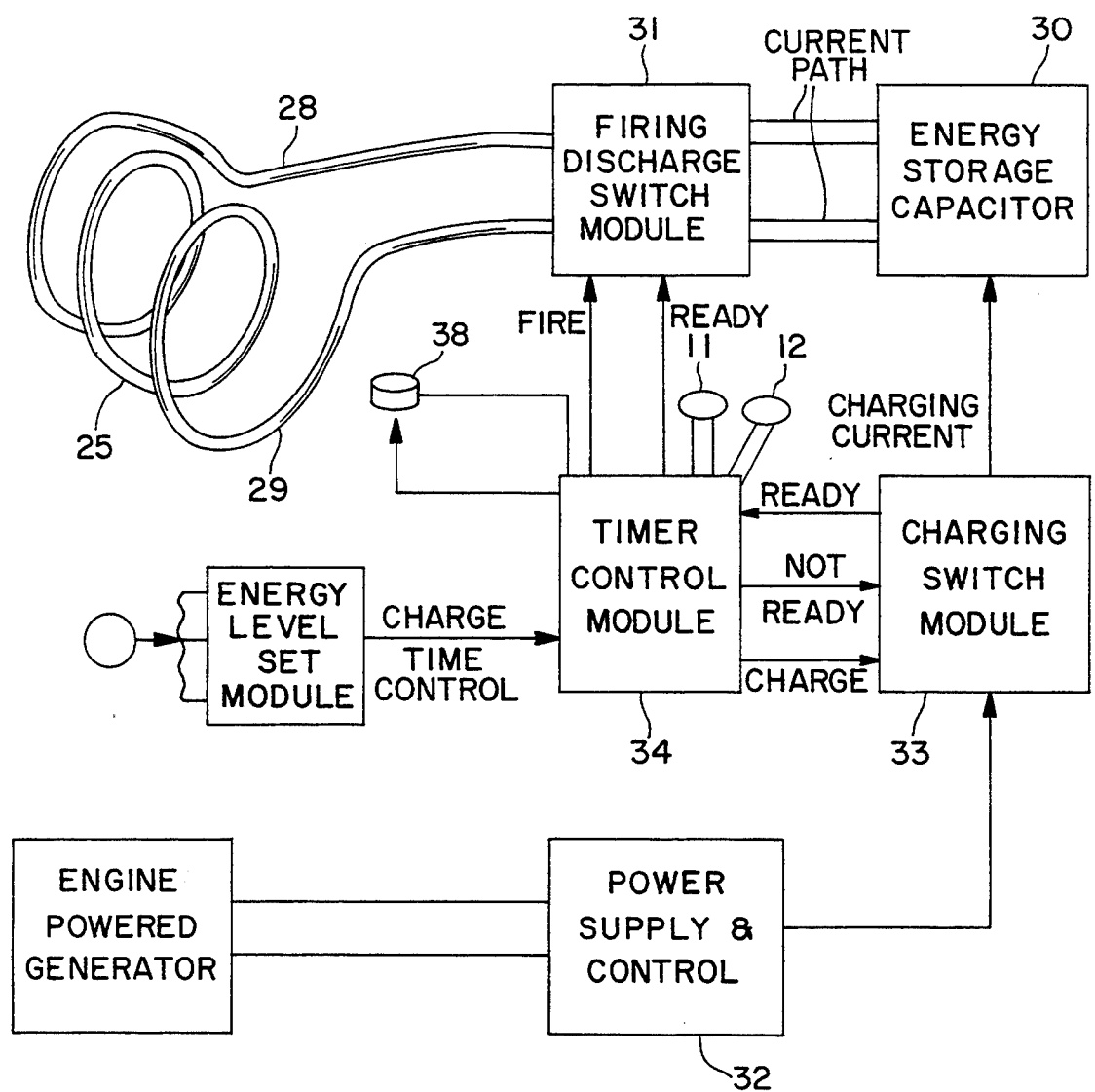
FIG. 3 is a block diagram of the invention.

FIG. 3 is a functional block diagram showing the various required modules in the system to supply the necessary pulse of decaying current to the work coil with its connectors closed. The coil is not connected to the energy storage capacitor 30 until the firing switch 31 closes. Switch 31 must remain open until the desired energy level of the capacitor has been achieved by charging from the power supply 32 through the charging switch 33. This charging switch must remain closed until the capacitor has been charged for a preset time as limited by the timer control module 34 set by the energy set level module 35. The charging switch 33 must open when the preset time has expired, and this event delivers a "ready" signal to the timer control module.

The charging action is indicated by a charging indicator light 36 which goes out when the charging switch opens. The readiness condition is indicated by the ready light 37 which remains on until the manual firing switch 31 is closed. When the firing switch is closed, it signals to the timer control unit 34 to close the firing discharge switch 38 if, and only if, the charging path switch module 33 is in an open condition. This last action permits the energy storage capacitor to suddenly discharge through the firing discharge switch module and the work coil. The preferred embodiment of the firing discharge switch (not shown) is a closed tube containing a few drops of mercury metal and having heavy contacts at one end. The tube is rotated by a solenoid to produce closure as the mercury metal falls to the contact end of the tube and flows against the contents. This keeps the heavy arc of contact closure confined in order to reduce any flame hazard. The charging switch, on the other hand can be a battery of silicon controlled rectifiers, since its current is smaller and is applied over a longer time. The reverse resistance of such rectifiers must be adequate to resist any significant leakage of the capacitor back through the charging power supply circuits. These rectifiers are placed in an "off" condition in order to prevent the closing of the discharge path from overloading the power supply. The energy to perform all of these operations may be provided by an engine driven generator or "alternator" mounted on the work vehicle.

Figure 4:
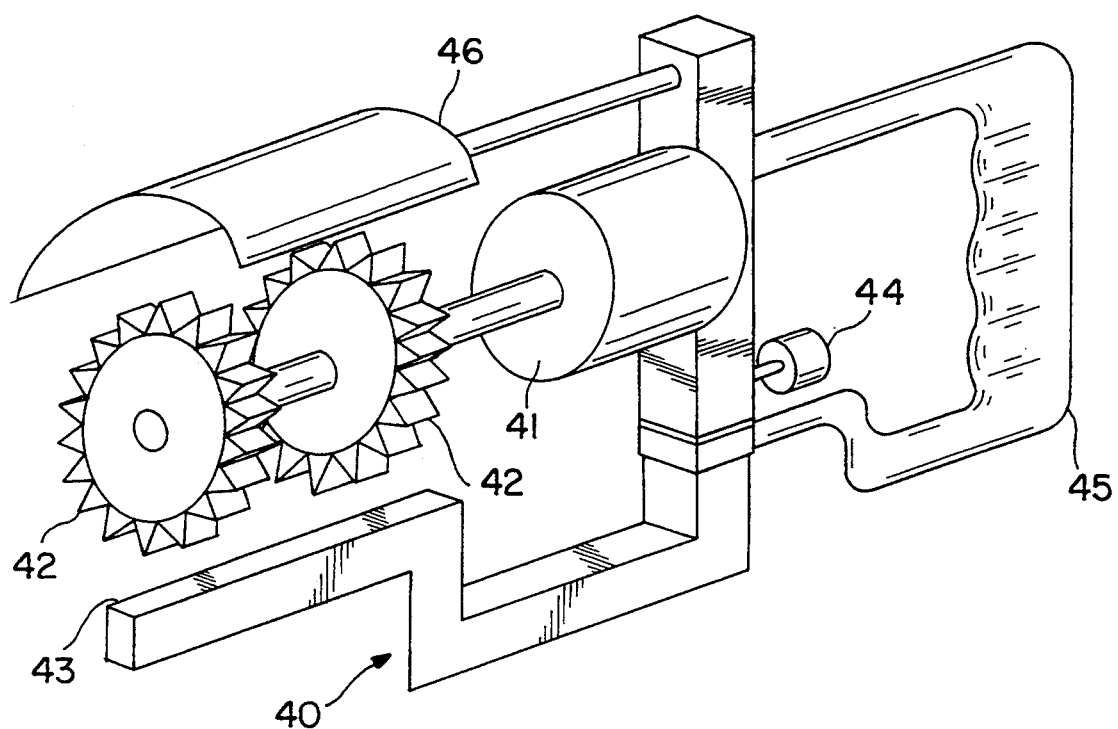
FIG. 4 shows a cutter for making grooves in the pipe segments.

The annular grooves in the pipe segments, when used, may be produced by the groove cutter 40 shown in FIG. 4. A drive motor 41 turns a multiplicity of milling cutters (or grinding wheels) 42 against the outside of the pipe with a pressure and depth of cut roughly controlled by an inside guide 43 which is slipped into position by means of telescoping lock screw knob 44. The assembly is maneuvered around the circumference of the pipe segment by use of a pistol grip handle 45 that holds the assembly together. A chip shield 46 protects the operator from flying debris as the grooves are being cut. The preferred embodiment of the cutters is high speed steel coated with a cathodic arc hard coating (as taught in U.S. Pat. No. 3,625,848 by Alvin A. Snaper) to greatly increase the useful life of the cutters in the field environment.

Alternately, the grooves may be applied during the pipe fabrication process or in some cases, depending upon service application of the pipe, eliminated entirely.

The method and apparatus provide the following advantages among others:

1. A relatively noiseless, rapid, economical and flameless system for joining pipes in a field environment.
2. A pipe joining method that does not require precision machining of the work pieces.
3. A systemized group of equipment that permits rapid application of the pipe joining system at almost any location.
4. A pipe joining method that precludes leaks or undue pressure drops.
5. A system for producing pipe joints that can introduce almost zero frictional discontinuity for the fluids solids or gases being conveyed in the pipe.
6. A pipe joining system that can so rapidly repair breaks and leaks in a limited number of pipe sizes as to greatly minimize the costly "down time" in such applications as repair of gasoline, oil, natural gas, water etc. pipes. Such repetitive repair needs may be encountered in such large pipe systems as oil wells, oil transport lines, city water systems or "aqueducts", natural gas supply lines, mine pump systems and chemical processing plants, etc.
7. A repair system that requires stocking of only a limited number of standard repair sleeve sizes.
8. A pipe joining system that will permit joining pipes of different diameters.
9. An effective pipe joining and repair system for such pipe intensive operations as central steam heating systems and chemical processing plants.

This invention is not to be limited by the embodiments shown in the drawings and described in the description, which are given by way of example and not of limitation, but only in accordance with the scope of the accompanying claims.

I claim:

1. A method for joining two large-diameter steel pipe segments together, each pipe segment having a central axis, an inner wall with an inner diameter, an outer wall with an outer diameter at least as large as 12 inches, said diameter of said two segments being equal to one another, an axial passage defined by the inner wall, a wall thickness between said walls, said wall thickness of said two segments being equal to one another and an end face extending between said walls, said method comprising:

placing the pipe segments in axial alignment with said end faces in close proximity to one another;

placing a metal tubular joining sleeve bridging between the two pipe segments, closely fitting to their outer walls adjacent to their end faces and overlapping them for a substantial distance;

surrounding said tubular sleeve adjacent to both of said end faces with an electrically conductive coil; and applying to said coil a brief electrical pulse to produce a magnetic field to shrink the sleeve onto said pipe segments, said coil being formed in two separate coil segments which are separately joined together to surround said sleeve when said coil segments are fitted around said pipe segments where they abut, and overlapping a substantial portion of said sleeve on each side of the adjacency of said pipe segments.

2. A method according to claim 1 in which an external peripheral groove is formed in the outer wall of each of the pipe segments, and said sleeve overlaps said grooves so as to be pressed into said grooves to increase resistance of the joined pipe segments to axial separation.

3. A method according to claim 1 in which an adhesive is placed between said outer walls and said sleeve.

4. Apparatus for joining two steel pipe segments together, each pipe segment having a central axis, an inner wall with an inner diameter, an outer wall with an outer diameter, an axial passage defined by the inner wall, a wall thickness between said walls, an end face extending between said walls, the pipe segments being in axial alignment, with said end faces in close proximity to one another and with a metal tubular joining sleeve bridging between the two pipe segments, closely fitting to their outer walls adjacent to their end faces, said apparatus comprising:

a ring-shaped segmented electrically conductive coil surrounding said tubular sleeve adjacent to said end faces, said tubular coil being formed in two semi-circular segments hinged together to open and receive said sleeve and pipe segments, connector means to join the coil segments together when the coil encircles the pipe segments, to form a complete coil circuit, and a source of pulsed electrical current for said coil circuit to provide a brief, intrusive magnetic field.

* * * * *